Patented Feb. 19, 1935

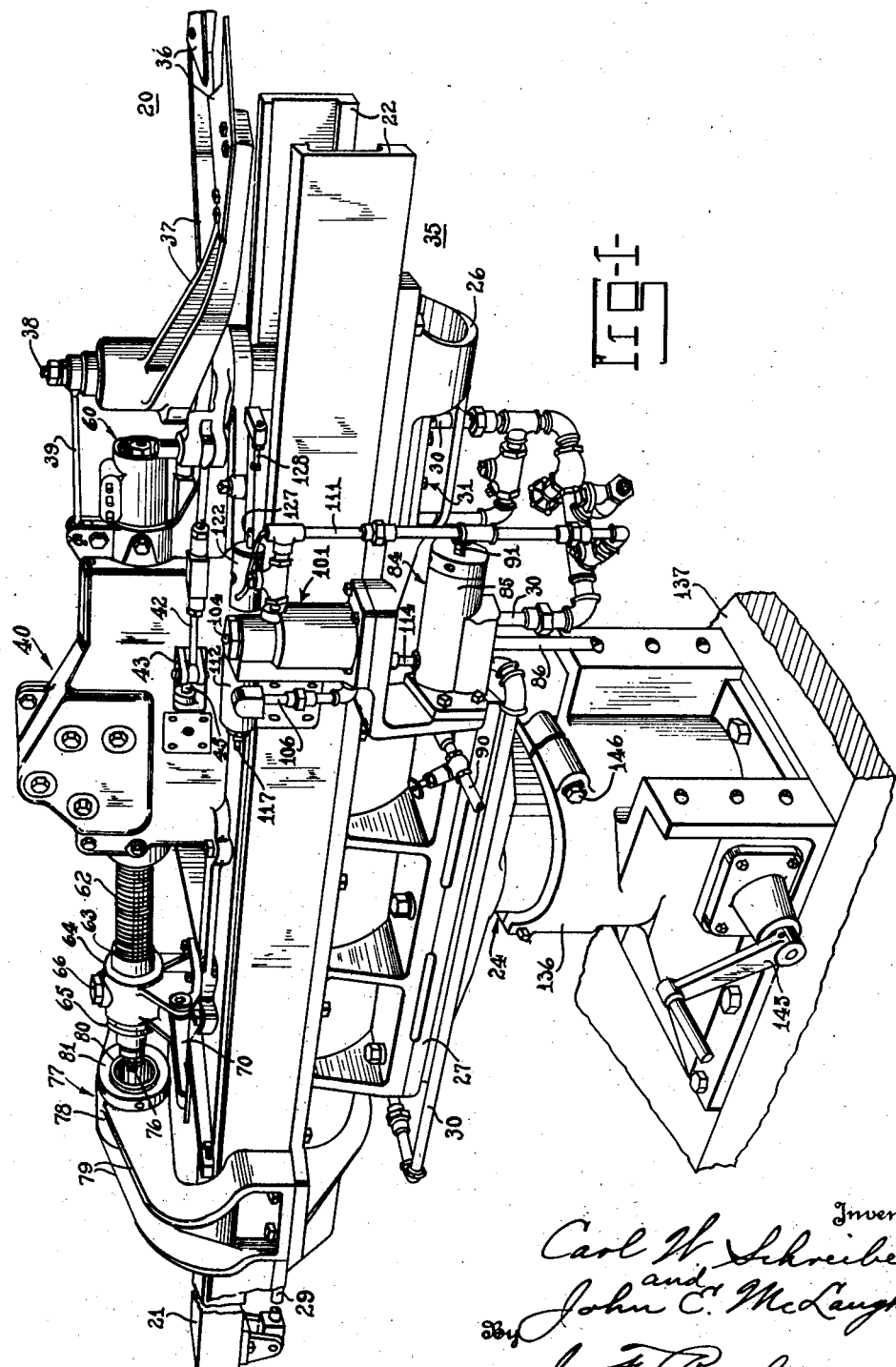

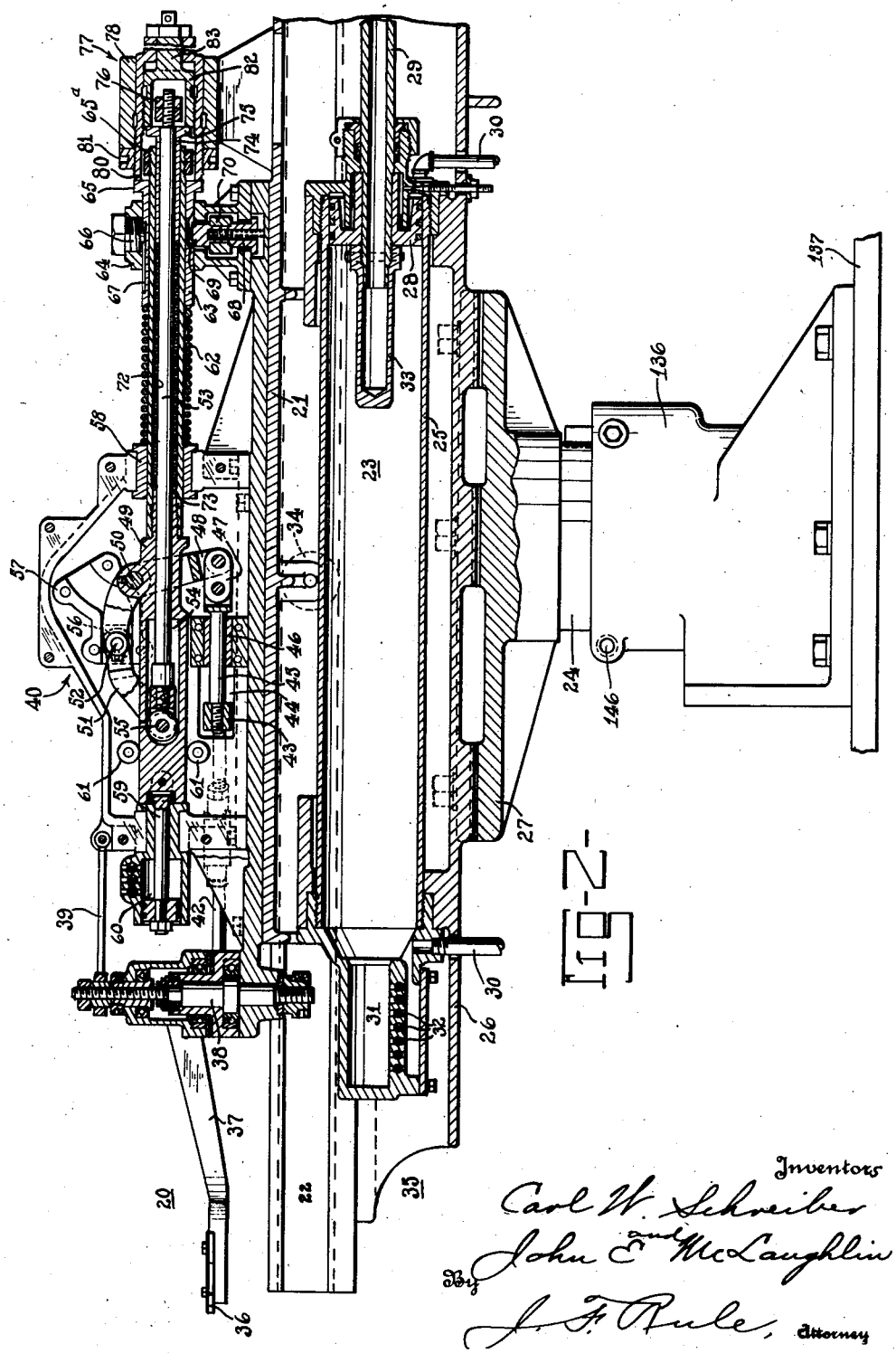

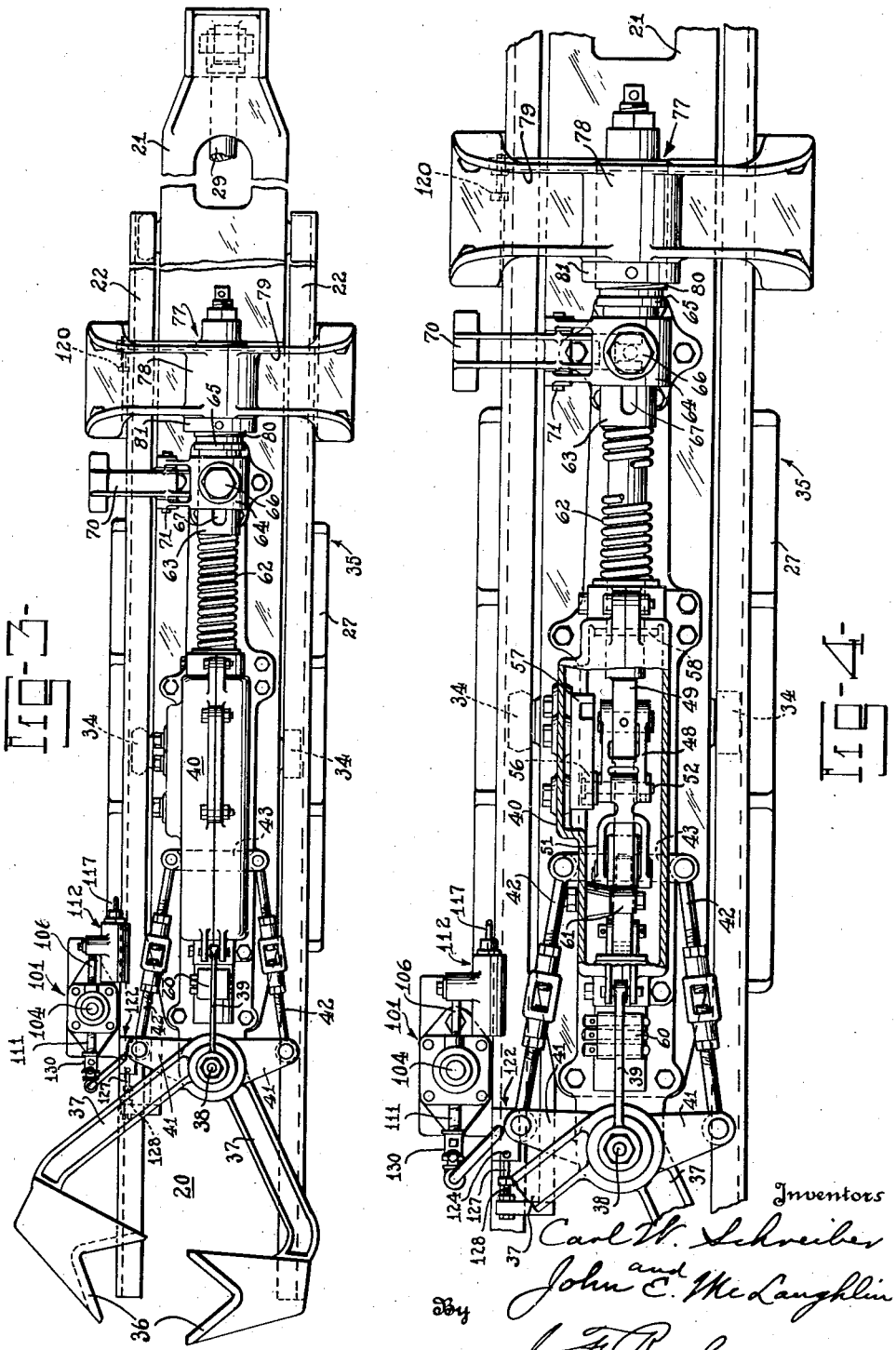

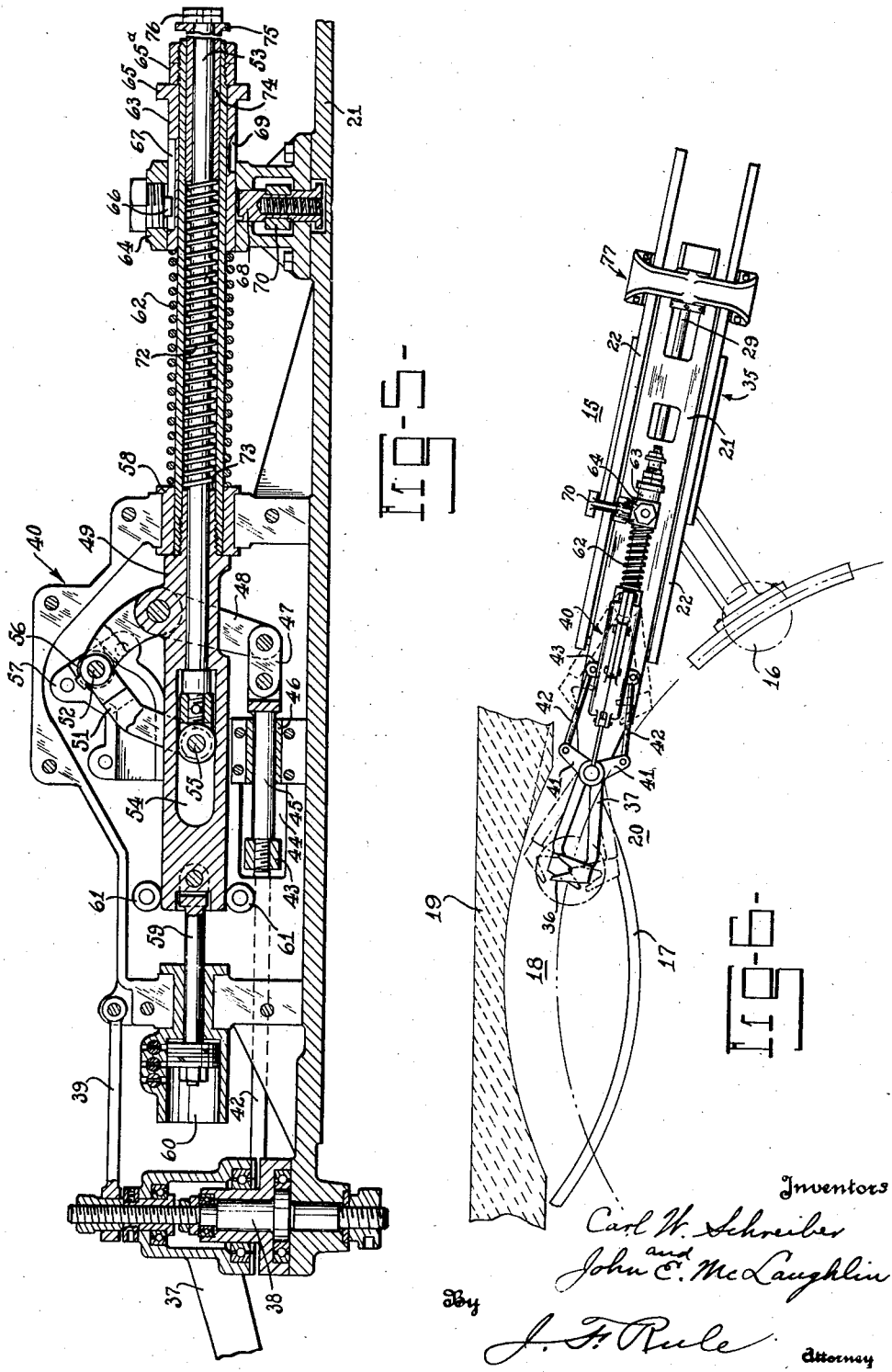

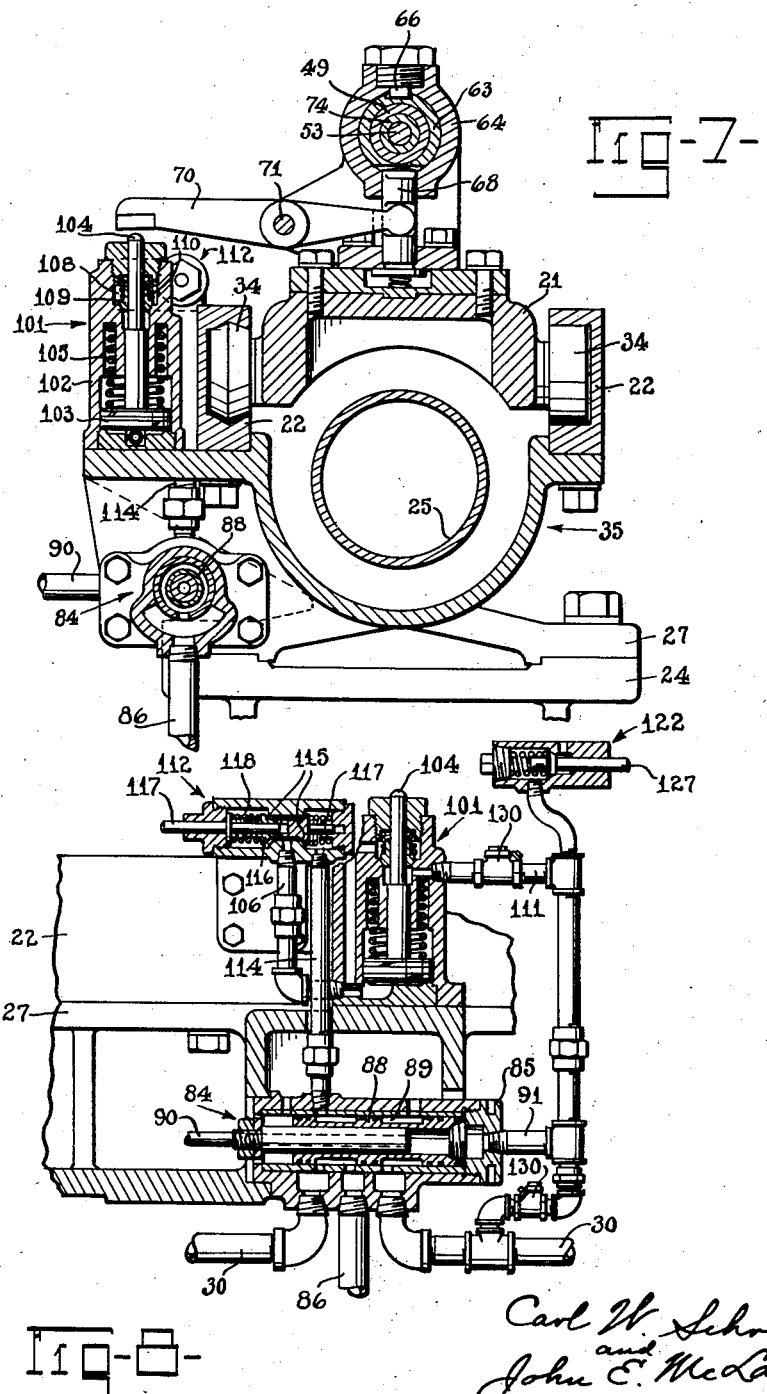

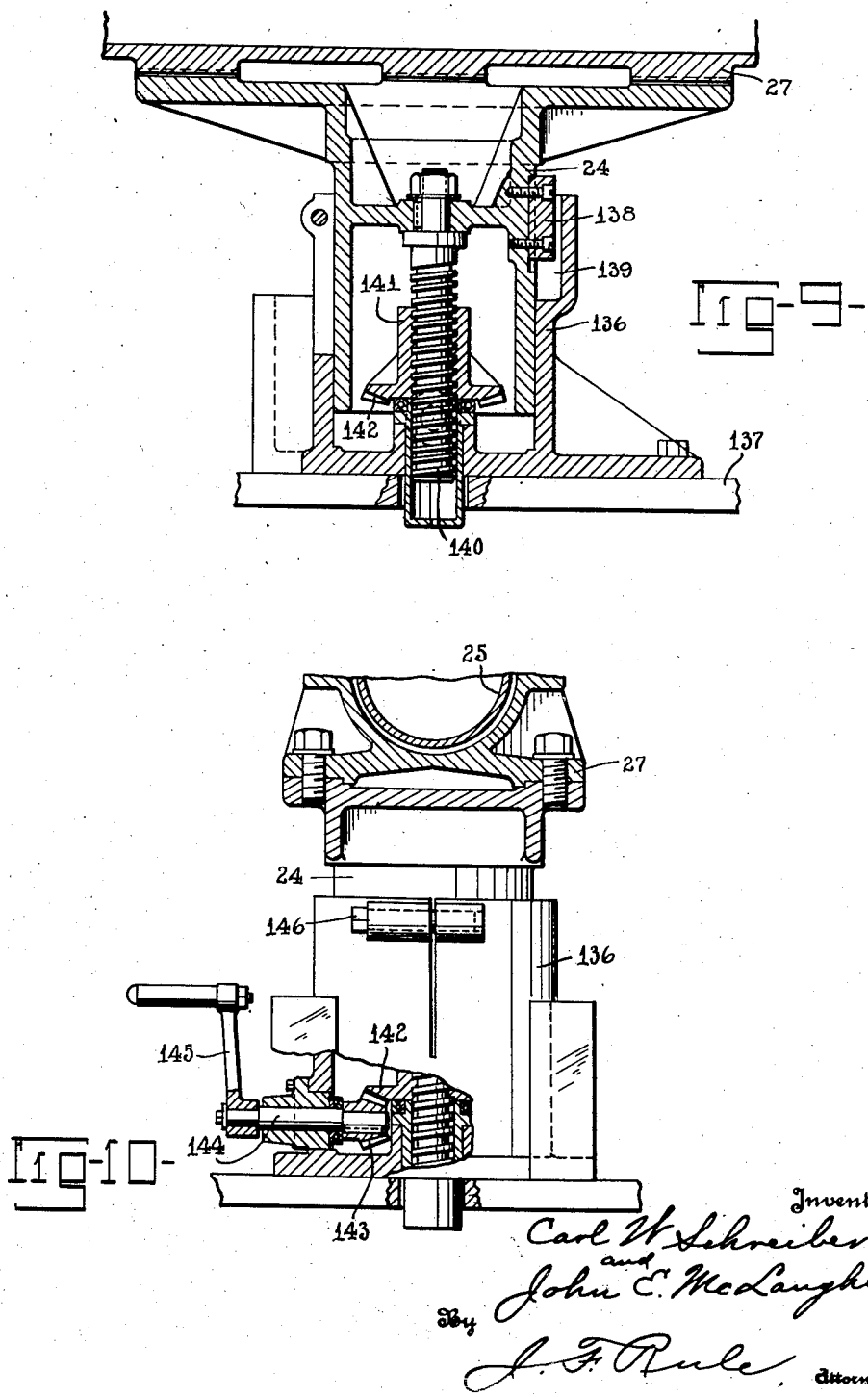

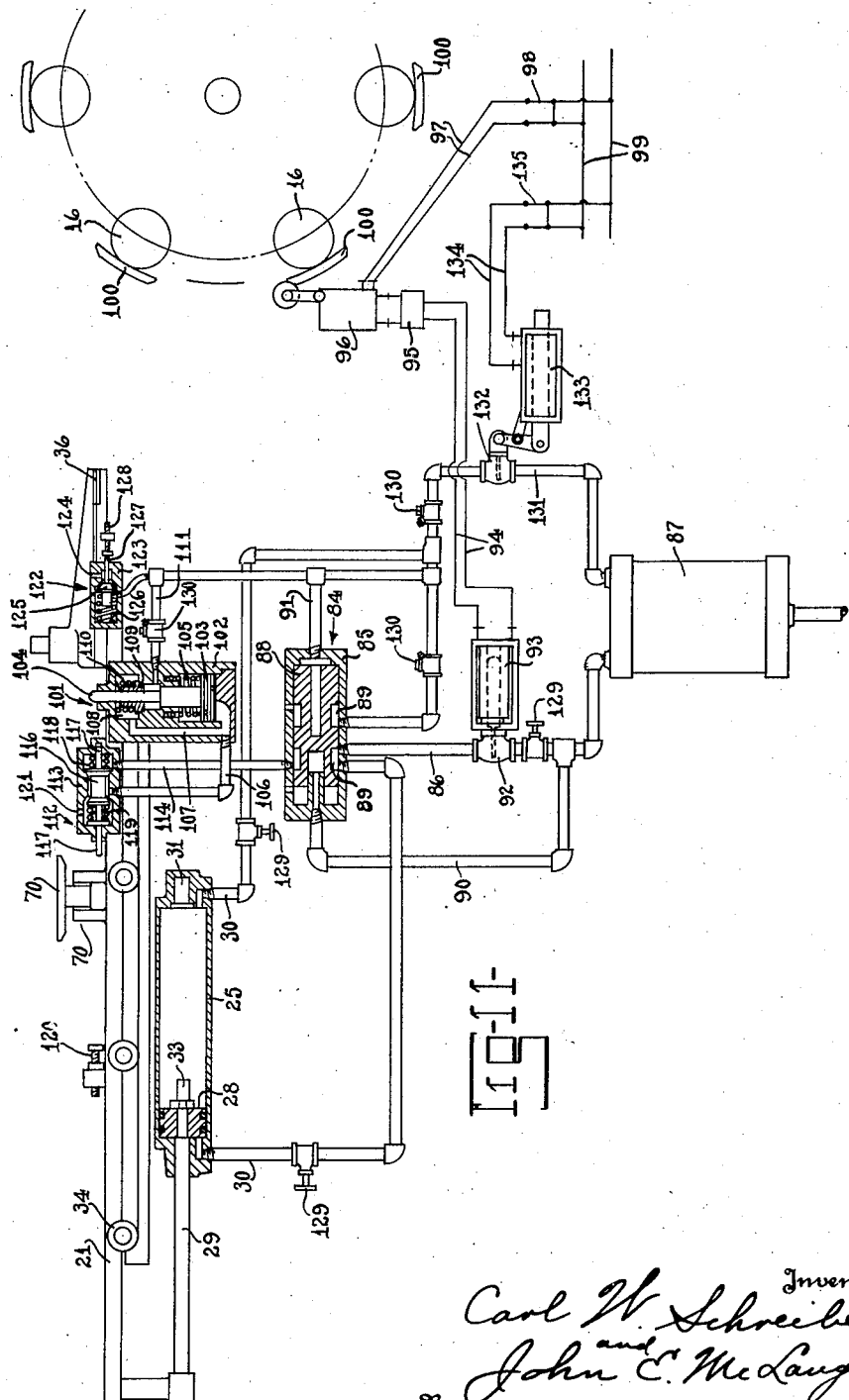

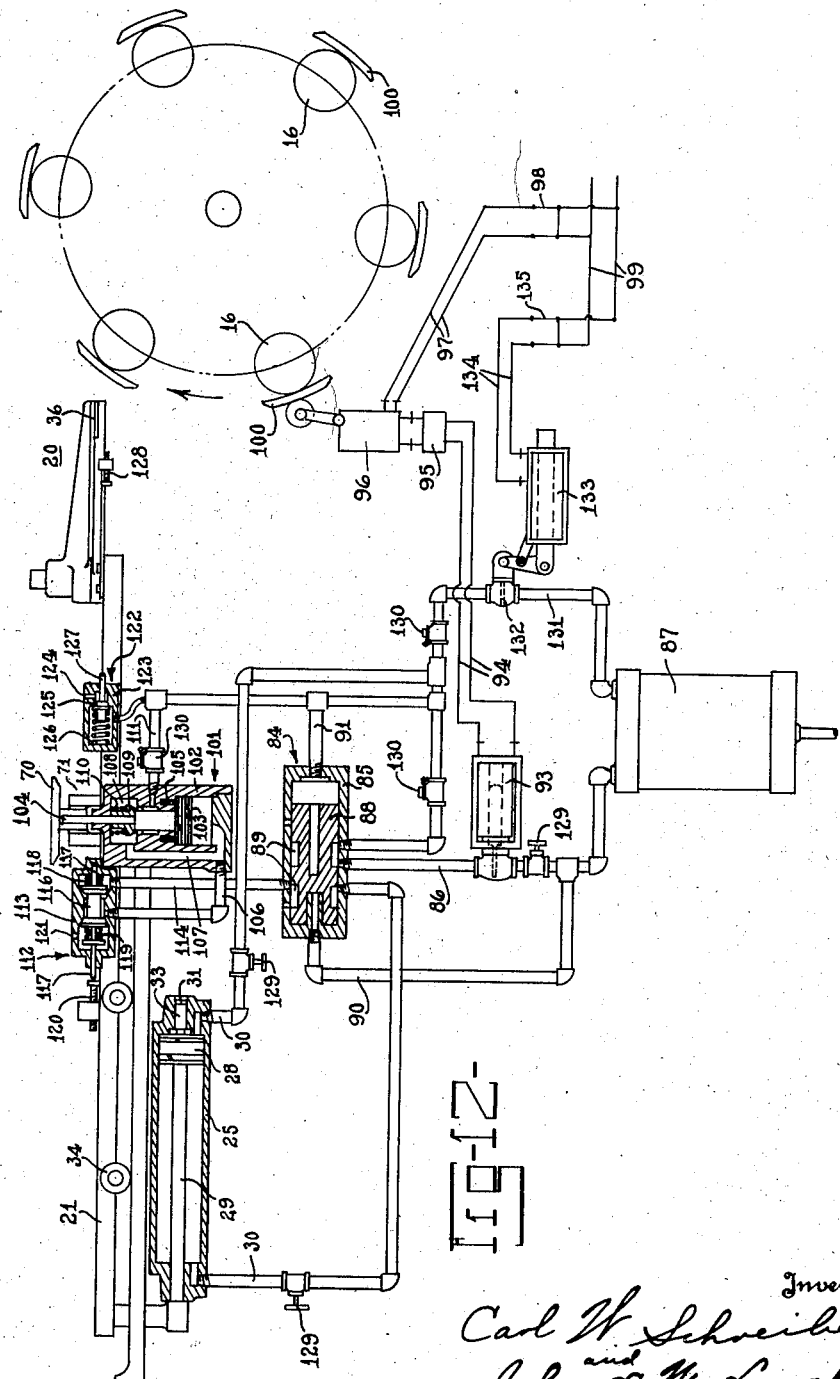

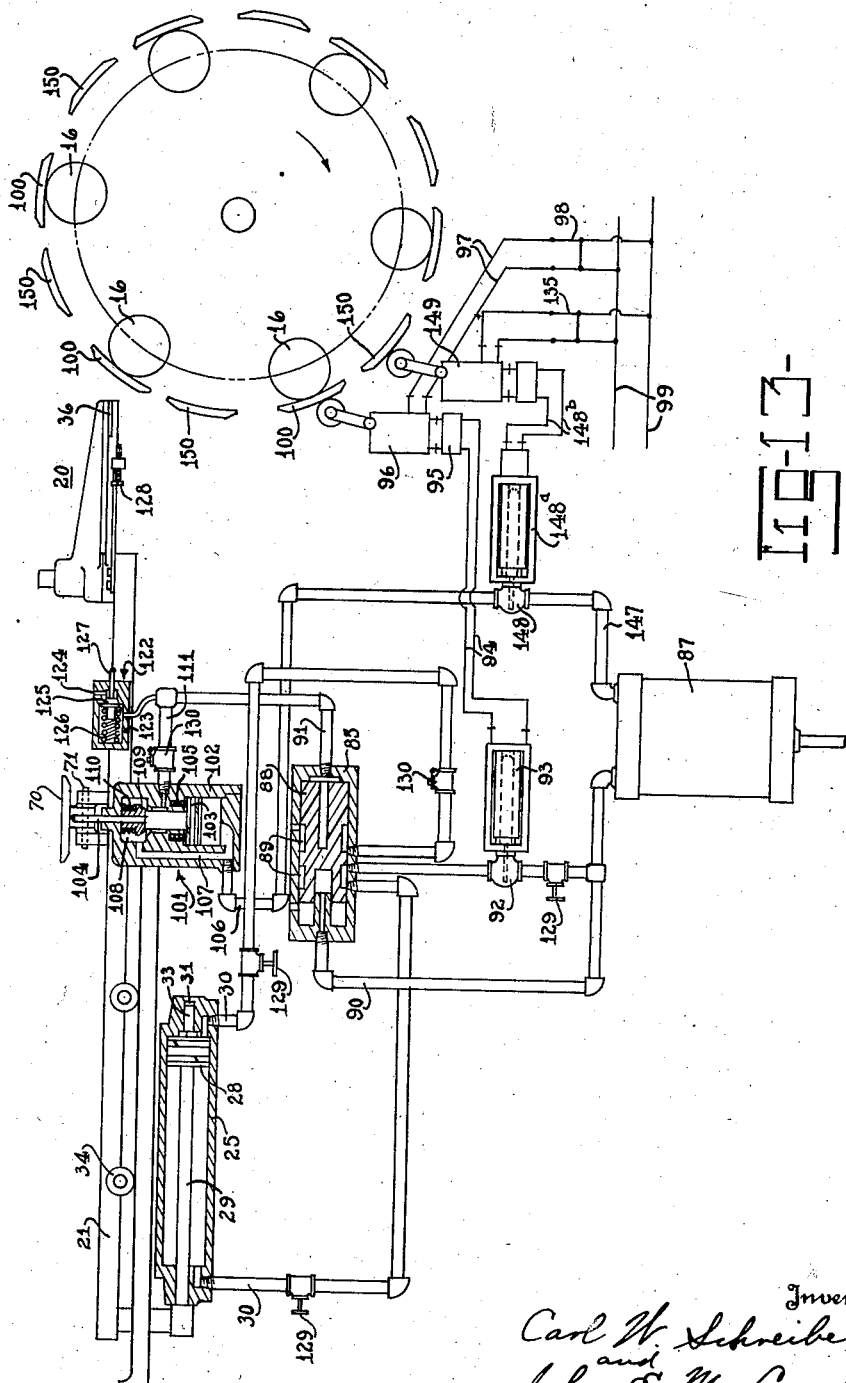

1,991,705

UNITED STATES PATENT OFFICE 1,991,705

CHARGE SEVERING MECHANISM

Carl W. Schreiber and John E. McLaughlin, Alton, Ill., assignors to Owens-Illinois Glass Company, a corporation of Ohio Application April 18, 1933, Serial No. 666,726

18 Claims. (Cl. 49—5)

The present invention relates to improvements in mechanism for severing gathered mold charges from a supply body of molten glass, and is particularly adaptable for use in conjunction with glassware forming machines in which downwardly opening suction type blank molds are moved along a closed path and brought in succession into contact with the exposed upper surface of a supply body of molten glass from which measured charges are obtained.

An object of the present invention is the provision of a shear type cut-off common to all of the molds of a bottle forming machine and capable of effecting separation of the gathered mold charges from the supply body of glass without excessively chilling the bottom end of the charges. This latter feature is of considerable importance in that it tends to reduce the size and depth of the cut-off scar and thereby contributes materially to the production of quality glassware in which the bottoms are comparatively free from defects.

Another object is the provision of a novel type of charge severing mechanism common to the mold groups of a rotary machine and in which operation of the mechanism is directly controlled by movement of the molds. Thus the speed of operation of the charge severing mechanism will be automatically increased or decreased with and directly as a result of variations in the speed at which the forming machine is operated.

A further object is the provision of cut-off mechanism including shears and a novel form of operating mechanism for the shears whereby they are caused to quickly sever gathered mold charges from the supply body and move out of contact with the glass. Thus chilling of the glass due to contact with the cut-off knife or shears is greatly reduced.

Another object is the provision of charge severing mechanism in which shears are moved back and forth between idle and working positions and caused to dwell momentarily in the working position prior to the actual cutting movement of the shears. Thus excessive vibration resulting from movement of the shears between said positions is removed prior to the actual cutting operation and as a result the cutting level and its relation to the charging end of the molds are constant.

A still further object is the provision of a novel form of spring device for effecting relative movement of the shear blades and means whereby operation of the device is directly controlled by movement of the shears between working and idle positions.

It is also an object to provide means whereby the cutting level of the shears may be adjusted to compensate for variations in the length of the blank molds with which the machine is equipped.

Other objects will be in part apparent and in part pointed out hereinafter.

In the drawings:

Fig. 1 is a perspective view of the charge severing mechanism.

Fig. 2 is a fragmentary sectional view with parts in elevation showing the shears retracted.

Fig. 3 is a fragmentary plan view.

Fig. 4 is a detail fragmentary plan view with parts broken away and in section.

Fig. 5 is a fragmentary vertical longitudinal sectional view showing in detail the shear operating mechanism.

Fig. 6 is a plan view illustrating more or less diagrammatically the relation between the charge severing mechanism and the blank molds of a bottle forming machine.

Fig. 7 is a transverse sectional view showing the control means for the shear operating device.

Fig. 8 is a detail sectional view of part of the control mechanism.

Fig. 9 is a fragmentary sectional view showing the elevating mechanism for the shears.

Fig. 10 is a sectional elevational view thereof.

Fig. 11 is a diagrammatic view showing the air pipe lines and the shears retracted.

Fig. 12 is a view similar to Fig. 11, showing the shears projected.

Fig. 13 is a diagrammatic view showing a slightly modified form of apparatus.

In more or less general terms the present invention involves equipping a rotary type bottle blowing machine with charge severing mechanism consisting of a pair of shears common to all of the mold groups. The shears which are arranged in proximity to the forming machine and container for molten glass are at regular time intervals placed over the supply body of glass in position to sever gathered mold charges from the latter. In one form of the invention the shears are operated immediately upon reaching their fully projected position while in another form they are allowed to rest a moment after complete projection before actually severing the gathered mold charge. This latter method of operating the shears removes vibration from them in advance of the cutting movement and insures severance of the charges at a constant level and without any tendency to give the bottom end of the gathered charges a mushroom form. It is evident that projection of the shears and sudden stopping of their forward movement may set up considerable vibration in the shear blades.

The charge severing unit 15 is arranged at one side of a rotary type bottle forming machine including an annular series of suction type blank molds 16, said machine adapted to gather mold charges of molten glass from a supply body in a revolving pot 17 which includes an exposed gathering area 18 defined in part by the jack arch 19 of a melting furnace (not shown). The charge severing unit includes shears 20 carried by a horizontal ram 21 which is mounted in slideways 22 for reciprocation between two positions. While in their projected position the shears are operated to sever gathered mold charges from the supply body and in the other or retracted position are at rest awaiting arrival of one of the molds at the charging position preparatory to another projection to the cutting position.

Reciprocation of the ram is obtained by means including a fluid operated motor 23, the operations of which are directly controlled by movement of the molds 16. This motor 23 is mounted at the upper end of a pedestal 24 and includes a horizontal cylinder 25 arranged in a cradle 26 or carrier which in turn is bolted or otherwise separably connected to a plate 27 at the upper end of said pedestal 24. A piston 28 in the cylinder 25 is connected to a piston rod 29 which extends through one end of said cylinder 25 and as shown in Fig. 11, has its outer end secured to the ram 21. Air under pressure is supplied to the opposite ends of the motor cylinder 25 in alternation through pipes 30 which lead to a source of supply of air under pressure (not shown) by way of control devices as will be brought out hereinafter. The motor is provided at its forward end with an air cushioning device to reduce the shock incident to stopping forward movement of the piston 28. This device consists of a cylinder 31 at the forward end of the motor, opening at one end into the motor cylinder and provided with a longitudinal series of small exhaust ports 32. A piston 33 at the forward end of the piston rod 29 beyond the motor piston 28 is adapted for projection into said cylinder 31 slightly ahead of the time the ram reaches its extreme forward position. It is evident that because of the size of the exhaust ports 32 pressure is momentarily built up in the cylinder 31 and acts as an air cushion in the reduction of shock and strain on the various parts of the mechanism.

The ram 21 assumes the form of a slide provided at intervals along its side margins with rollers 34 running in opposed ways or tracks 22 in the inner vertical faces of the carriage 35. The shears 20 are mounted at the forward end of the ram 21 and include a pair of cooperating blades 36 mounted upon the outer ends of a pair of shear arms 37 which at their inner ends are journaled upon a vertical hinge pin 38 rising from said ram. The upper end of the hinge pin is connected through a brace rod 39 to a housing 40 within which a part of the mechanism for operating the shears is enclosed.

The shear operating mechanism includes spring means whereby the blades are moved both toward and from each other at each end of the path of reciprocation of the ram. The specific construction involved may be as follows: Fingers 41 at the inner ends of the shear arms 37 are connected through adjustable rods 42 to a cross head 43 or bar, which extends through a pair of opposed longitudinal slots 44 in the side walls of the housing 40. A rod 45 connected at its forward end to said cross head is slidingly supported in a guide 46 on the upper side of the ram and within the housing 40. The other end of the rod 45 is connected through a link 47 to the lower end of a bell crank lever 48, said lever being disposed in a vertical plane and straddling a tubular shaft 49 or sleeve which forms a part of the lever rocking mechanism as will be apparent presently. A hinge pin 50 on the upper side of this sleeve 49 is connected at its ends to said bell crank lever 48. A bifurcated link 51 is connected through the hinge pin 52 to the upper end of the bell crank lever and at its other end is suitably connected to the forward end of a push rod 53, the latter slidingly telescoped into said tubular shaft 49 or sleeve. A longitudinal slot 54 provided in the sleeve 49 accommodates a connecting pin 55 through which the link 51 and push rod 53 are secured together and allows for limited relative axial movement between said sleeve and rod. The cam roll 56 mounted at one end of the hinge pin 52 runs in a stationary cam 57 on the inner face of one of the side walls of the housing 40. This cam which is substantially V-shaped, provides means whereby the sleeve 49 and rod 53 move as a unit at times and at other times are subject to relative axial movement, such movements being essential to proper operation of the shears as will be apparent hereinafter.

The sleeve 49 referred to above consists of two sections suitably connected together and slidingly supported in a horizontal guide 58 at one end of the housing 40. The forward end of the sleeve is connected through a rod 59 to an air cushioning device 60 which operates in the same fashion as the cushioning device at the front end of the ram reciprocating motor. Rollers 61 in the housing 40 assist in guiding the sleeve 49 in its reciprocating movements. A main spring 62 encircles the sleeve 49 outside of the housing 40, being confined between the guide 58 and a spring compression collar 63, the latter being slidingly fitted in a guide 64 attached to the upper side of the ram by suitable fasteners. A radial flange 65 is provided at the outer end of the spring compression collar 63 for a purpose which will be apparent presently. The collar 63 is held assembled with the sleeve 49 by means of nuts 65ª or the like elements. Axial movement of the collar 63 is limited by means of a pin 66 carried by the guide 64 and having its inner end projecting into a longitudinal groove 67 or channel provided in the outer surface of said collar. A spring pressed detent 68 carried by the guide 64 is adapted for projection into a recess 69 in the lower side of said collar 63 for the purpose of releasably holding the main spring 62 compressed. Release of the collar from the holding influence of said detent is obtained by rocking a lever 70 (Fig. 4) which is pivoted to a horizontal hinge pin 71. As will be apparent hereinafter this main spring 62 operates to bring the shear blades together for the purpose of severing the gathered mold charges from the supply body. Separation of the shear blades which obviously requires less pressure than movement of the blades through a stream of glass, is effected by a spring 72 of lighter construction than the main spring 62. The light spring 72 encircles the push rod 53 and is enclosed by a part of the sleeve 49. The spring is confined between a stop 73 constituting a part of said sleeve 49 and a collar 74 at the outer end of the push rod 53. A radial flange 75 at the outer end of the collar 74 is adapted for engagement with a stationary stop as and for the purpose set forth hereinafter. The rod 53 and collar 74 are held assembled by means of a locking nut 76.

Compression of springs 62 and 72 in succession prior to each projection of the ram is obtained by bringing the radial flanges 65 and 75 into engagement with a stationary stop 77 which is suitably mounted upon the main carriage 35. This stop includes the housing 78 connected through legs 79 to said carriage. A sleeve 80 fits into the housing 78, said sleeve having externally screw threads designed for engagement with an adjusting link 81. The ram bears against the forward end of the housing 78 and may be adjusted to advance or retard the position of the inner end of the sleeve which engages the radial flange 65 on the spring compression collar 63. Within the sleeve 80, which has one end closed, is a second sleeve 82 intended to engage the radial flange 75 on the inner collar 74. This inner or second sleeve 82 has threaded engagement with the sleeve 80 and is provided with an axial stem 83 extending through the closed end of the outer sleeve 80 so that it may be engaged by any suitable implement in rotating said inner sleeve. Such rotation of the sleeve adjusts its position with respect to the sleeve. Either or both of these adjustments may at times become necessary in order that the collar 63 will be properly engaged by the detent 68 and the springs compressed to the necessary degree.

Operation of the ram reciprocating motor 23 and rocking of the lever 70 for releasing the shear actuating springs, are controlled and effected in timed relation with movement of the molds 16 of the forming machine. The construction involved may be substantially as follows: The air supply pipes 30 connected to the opposite ends of the ram reciprocating motor 23 lead to a reversing valve 84 (Fig. 11), the pipes being threaded into openings in the valve housing 85. A main supply pipe 86 connected to an air pressure tank 87, is threaded into an opening in the housing 85 at a point centrally between the points of connection of the pipes 30 to said housing. Within the valve housing 85 which is of cylindrical form, is a reciprocating differential piston 88, said piston formed with two continuous channels 89 in its periphery, which are so spaced apart and of such dimensions that when the piston 88 is in one position the supply pipe 86 communicates with one of the air lines 30 and in its other position said supply pipe 86 is brought into communication with the other air line 30. Reciprocation of the piston at regular time intervals in order to reverse the operation of the ram reciprocating motor 23 is obtained by applying air under pressure to the opposite ends of the housing 85. A supply pipe 90 communicating with the air supply tank 87 is connected to one end of said housing and provides for constant application of air to the corresponding end of the piston 88 which end is of less area than the other in so far as that portion to which air is applied is concerned. A pipe 91 opens into the opposite end of the valve housing 85 and is indirectly connected to the source of supply of air under pressure as will be brought out presently. A solenoid controlled gate valve 92 in the supply line 86 is opened automatically in timed relation with movement of the molds 16 past a given point to thereby permit flow of air under pressure to said valve 84 and thence to the opposite ends of the ram reciprocating motor in alternation. The solenoid 93 is connected through lines 94 to a relay 95 and thence to a limit switch 96. This limit switch is connected through current conductors 97 and a switch 98 to the main power line 99. The limit switch is operated at regular time intervals by cams 100 individual to and rotating with the molds 16.

Complete projection of the ram bringing the shears 20 to the charge severing position is followed immediately by rocking of the lever 70 and expansion of a main spring 62 and immediately thereafter, the expansion of the spring 72. Such expansion of the springs brings the shear blades together for the purpose of severing the stream or string of glass from the gathered mold charges and separation of the blades immediately following the cutting stroke. The mechanism for moving the lever 70 may well be constructed as follows: A trip device 101 (Figs. 7, 8, and 11) is mounted on one side of the main carriage 35 near the front end thereof directly below the path of travel of the outer end of said lever 70. This trip device includes a vertical air cylinder 102 and a piston 103 therein carrying a plunger 104 or pin which extends upwardly through suitable guides provided in said cylinder. A coil spring 105 yieldingly holds the piston 103 at the lower end of the cylinder. Air is supplied to the lower end of the cylinder through a pipe 106. A conduit 107 formed in the cylinder wall leads to a chamber 108 at the upper end of the cylinder. A valve 109 normally closed by a spring 110 is opened by upward movement of the piston 103 to permit flow of air from said chamber 108 to the pipe 111 which leads to the air pipe 91 referred to heretofore as being connected to one end of the reversing valve 84. A trip valve 112 (Figs. 8 and 11) arranged in proximity to and rearwardly of the trip device 101, controls the application of air under pressure to said device as well as to one end of the reversing valve 84. The construction of the trip valve 112 includes a horizontal cylinder 113 fixed to the ram carriage 35 and connected to the pipe 106 and a supply line 114 which at its other end communicates with the interior of the housing 85 of the reversing valve 84. The pipe 106 (Figs. 8 and 11) communicates with the interior of the trip valve cylinder 113 between two opposed valve seats 115. A spool valve 116 (Fig. 8) consisting of two separable sections (as is customary and well known) is provided with opposed stems 117 slidingly supporting it in the cylinder 113. A coil spring 118 normally holds the valve in position to shut off communication between the pipes 106 and 114. At the other side of the valve a coil spring 119 encircles the stem 117 providing yielding connection between said stem and the adjacent end section of the valve 116. An adjustable stop 120 carried by the ram 21 is adapted to engage the adjacent end of the stem 117 upon a predetermined degree of projection of the ram and thereby actuate the valve 116 for the purpose of establishing communication between the pipes 106 and 114. Thus air is supplied to the lower end of the cylinder and projects the plunger 104 into engagement with the lever 70.

Upon completion of each cycle of operations and closing of the valve 116 to shut off communication between the pipes 106 and 114, it is necessary to exhaust the air from said pipe 106 as well as the interior of the trip cylinder 102. An exhaust port 121 in the trip valve cylinder 113 permits exhaust of air from the pipe 106. A relief valve 122 (Figs. 8 and 11) connected to the pipe 111 is actuated at the moment the ram reaches its fully retracted position. This valve includes a cylinder 123 provided with an exhaust port 124 and a valve body 125 normally held in closed position by a spring 126. A stem 127 carried by the valve body 125 is adapted to engage an adjustable stationary stop 128 which is suitably mounted upon the front end of the ram 21 and in such position that it engages the valve stem 127 during retraction of the ram.

Manually operable valves 129 (Fig. 11) provide means whereby the air supply may be shut off from the ram reciprocating motor. Automatic check valves 130 are provided in certain of the pipes to prevent backing up of pressure where it would be objectionable.

In view of the fact that the flow of air under pressure to the opposite ends of the ram reciprocating motor is controlled and regulated by a solenoid actuated valve 92 (Fig. 11), operation of this valve obviously depends upon a continuous availability of a supply of electric current. Provision is made whereby in the event of power failure the ram motor will be operated to retract the ram and thereby place the shears in their inoperative position. The construction in this connection is substantially as follows: The air supply tank 87 is connected through a pipe 131 (Fig. 11) to the supply pipe 30 which provides for communication between the front end of the ram reciprocating motor 23 and the reversing valve 84. A solenoid operated valve 132 in this pipe 131 is normally held closed by an energized solenoid 133 which is connected through conductors 134 and a switch 135 to the power supply line 99. Obviously, so long as electric current is supplied to the solenoids 93 and 133, the entire mechanism may be operated in a normal fashion. In the event of power failure the valve 92 will be closed due to the fact that the solenoid 93 cannot be energized and the core thereof immediately moves downward by gravity and carries with it the valve 92. At the same time the solenoid 133 will likewise become deenergized resulting in downward movement of the core and opening of the valve 132. Because the tank 87 contains a sufficient amount of air under pressure to move the piston 28 or ram reciprocating motor 23, it is evident that the ram will be retracted due to the flow of air through the pipe 131, valve 132, and pipe 30 leading to the front end of the motor 23.

In the following description of the operation it will be assumed that the ram 21 and, therefore, the shears occupy their fully retracted position and one of the blank molds 16 is just approaching the charge severing position. It is understood that air under pressure is applied constantly to the small end of the piston 88 constituting part of the reversing valve 84 so that normally said valve is in position to permit application of air to the back end of the ram reciprocating motor 23 immediately upon opening of the valve 92. Upon arrival of the blank mold at a predetermined point the cam 100 traveling therewith actuates the limit switch so that the solenoid 93 connected thereto, is energized and opens the valve 92. Immediately air under pressure flows through the pipe 86 to the annular channel 89 at the left end of the piston 88 (Fig. 11) and thence through the pipe 30 to the ram reciprocating motor 23. This results in forward movement of the piston 28 and consequent projection of the shears to the cutting position. Substantially at the time the ram reaches its fully projected position the stop 120 moves the spool valve 116 to the right (Figs. 11 and 12) establishing communication between the pipes 106 and 114. Air under pressure flows through these pipes to the lower end of the trip cylinder 102 causing quick upward movement of the piston 103 and stem or plunger 104 so that the latter engages and rocks the lever 70 (Figs. 7, 11, and 12). Rocking of this lever retracts the spring pressed detent 68 (Figs. 2 and 7) from engagement with the spring compression collar 63. Immediately the main spring 62 expands causing movement of the sleeve 49 and push rod 53 as a unit to the right in Fig. 2. Through the rod 45 (Fig. 2) and links 42 the shear blades are moved toward each other about the hinge pin 38. Thus the gathered mold charge is severed from the supply body. This unitary movement of the sleeve 49 and push rod 53 is in part the result of the cam roll 56 riding in the lower horizontal portion of the stationary cam 57. The actual cutting operation will be complete at the time the cam roll reaches the inner end of said horizontal portion. Immediately upon completion of the cutting operation and arrival of the cam roll 56 at the inner end of said horizontal portion of the cam 57 preparatory to upward movement of the roll in the substantially vertical part of the cam, the coil spring 72 expands causing relative movement between the lever 48 and link 51 and, therefore, between said sleeve 49 and push rod 53. This results in a quick forward movement of the rod 45 which operates through the links to separate the shear blades 36. Thus the charge severing operation is completed and the shears opened.

Retraction of the ram and therewith the shears 20 quickly follows the above described movement of the shear blades. This involves reversing of the position of the piston 88 from that shown in Fig. 11, to that indicated in Fig. 12. At the time the piston 103 and plunger 104 move upwardly to operate the lever 70, the valve 109 is opened so that air under pressure flows through the conduit 107 past said valve 109 and through said pipes 91 and 111 to the right end of the reversing valve. The piston 88 is thereby moved completely to the left end of the cylinder (Fig. 12) and because the valve 92 is still opened, air under pressure flows from the tank 87 flows by way of the pipe 86 and the annular chamber 89 at the right end of the piston 88 to the pipe 30 which is connected to the front end of the motor 23. Immediately upon completion of the ram retracting operation the limit switch 96 is closed with the result that the valve 92 is closed under the weight of the core of the solenoid 93. At the time the ram reaches its fully retracted position the relief valve 122 is operated to permit complete removal of the air pressure which may have been retained in the cylinder 102. As stated heretofore, power failure results in closing the valve 92 and opening of the valve 132, the latter operation permitting flow of air under pressure to the front end of the motor 23 and consequent complete retraction of the ram with the shears 20.

Retraction of the ram first brings the flange 75 on the collar 74 into engagement with the sleeve 82, thereby compressing the coil spring 72 which encircles a part of the push rod 53. Immediately thereafter and with continued retraction of the ram, the radial flange 65 on the spring compression collar 63 is brought into contact with the outer sleeve 80 and additional retractive movement of the ram compresses the main spring 62 sufficiently to bring the collar 63 into position for holding engagement with the spring pressed detent 68. Thus the mechanism is again ready for projection to the cutting position.

The ram carriage and parts supported thereon are readily adjustable vertically in order to compensate for variations in the length of the molds of the forming machine and thereby insure proper clearance between the shears and charging end of the molds. The construction involved consists of a vertical column 136 rising from a base 137 and telescoped over the pedestal 24, the latter carrying a key 138 fitted into a way 139 in said column. A worm 140 within the pedestal meshes with a collar 141 carried by a bevel gear 142, the latter meshing with a pinion 143 at the inner end of a horizontal shaft 144. By rotating a crank 145 at the outer end of said shaft the pedestal 24 may be adjusted vertically in the column 136. This column is split vertically and provided with a lock screw 146 by means of which it may be expanded and contracted in order to free the pedestal for adjustment and/or securely hold it against movement.

In another form of the invention (Fig. 13), provision is made whereby the ram and shears after complete projection preparatory to severing a gathered mold charge of glass from the supply body is followed by a short rest period just in advance of the actual cutting operation. This rest period allows complete removal of vibration from the shears and uniform clearance between the shears and molds. As a result, squeezing of the glass laterally beyond the margin of the mold charging opening between the shears and mold bottoms and variations in the length of the blanks because of cutting at different levels are avoided. The construction involved may be substantially as follows: The mechanism generally is substantially as shown in Fig. 11 (the preferred form), the main exception being that the trip valve 112 and stop 120 are omitted and in lieu thereof a pipe 147 leads directly from the air pressure tank 87 to the lower end of the trip cylinder 102. A solenoid operated valve 148 in the pipe 147 is connected to a solenoid 148a and thence through conductors 148b to a limit switch 149 which may be arranged in proximity to but rearwardly of the limit switch 96. A cam 150 is arranged rearwardly of each of the cams 100 and in such relation thereto that it actuates the limit switch 149 after the limit switch 96 has been operated and the ram completely rejected. Thus actual cutting movement of the shear blades does not take place until after a rest period on the part of the ram and shears at the charge severing position. This allows complete removal of vibration from the shears as pointed out above.

Modifications may be resorted to within the spirit and scope of the appended claims.

What we claim is:

1. In combination, a rotary mold carriage, an annular series of suction type blank mold groups thereon, means for continuously rotating the carriage to thereby move the molds in succession over a supply body of molten glass, means for delivering mold charges to said molds, charge severing mechanism common to all of the molds and including a cutter, means controlled by rotation of the carriage for placing the cutter over the glass at regular time intervals, means operating in timed relation to said placing of the cutter and movement of the molds for causing said cutter to sever gathered mold charges from the supply body, said cutter actuating means including a spring device, and means whereby movement of the cutter between the idle and working positions effects operative positioning and operation of the spring device.

2. Charge severing mechanism including a pair of shears, a horizontal ram supporting the shears at one end, means slidingly supporting said ram, means for reciprocating the ram to thereby move the cutter between cutting and rest positions, and means for opening and closing the shears including spring devices operated by reciprocating movement of said ram.

3. Charge severing mechanism including a horizontal ram, means slidingly supporting the ram, a pair of shear blades at one end of the ram, means for reciprocating the ram to thereby alternately place the shear blades in cutting and rest positions, means for moving the shear blades toward and away from each other, including links, a cross head to which the links are connected, and spring means operated in part by movement of the ram to actuate the cross head and thereby move said blades toward and away from each other.

4. Charge severing mechanism including a horizontal ram, means slidingly supporting the ram, a pair of shear blades at one end of the ram, means for reciprocating the ram to thereby alternately place the shear blades in cutting and rest positions, means for moving the shear blades toward and away from each other, including links, a cross head to which the links are connected, a series of levers pivoted together, means connecting one of the levers and the cross head, spring means for moving said levers, a cam roll on one lever, and a cam engaging the roll and shaped to in part control the path of movement of the levers so that the shear blades close and open at each end of the path of reciprocation of the ram.

5. Charge severing mechanism including a horizontal ram, means slidingly supporting the ram, a pair of shear blades at one end of the ram, means for reciprocating the ram to thereby alternately place the shear blades in cutting and rest positions, means for moving the shear blades toward and away from each other, including links, a cross head to which the links are connected, a series of levers pivoted together, means connecting one of the levers and the cross head, separate springs for moving the shear blades toward and away from each other, and means whereby the springs are operated one at a time.

6. Charge severing mechanism including a horizontal ram, means slidingly supporting the ram, a pair of shear blades at one end of the ram, means for reciprocating the ram to thereby alternately place the shear blades in cutting and rest positions, means for moving the shear blades toward and away from each other, including links, a cross head to which the links are connected, an elongated sleeve mounted above and parallel with the ram for limited axial movement relative to the latter, a rod extending axially through said sleeve, a lever pivoted to the sleeve and connected at one end to the cross head, means pivotally connecting the other end of said lever and the adjacent end of said rod, means for moving the rod and sleeve together a predetermined distance to close the shear blades, and means for effecting relative axial movement between said rod and sleeve to separate said blades.

7. Charge severing mechanism including a horizontal ram, means slidingly supporting the ram, a pair of shear blades at one end of the ram, means for reciprocating the ram to thereby alternately place the shear blades in cutting and rest positions, means for moving the shear blades toward and away from each other, including links, a cross head to which the links are connected, an elongated sleeve mounted above and parallel with the ram for limited axial movement relative to the latter, a rod extending axially through said sleeve, a lever pivoted to the sleeve and connected at one end to the cross head, means pivotally connecting the other end of said lever and the adjacent end of said rod, a coil spring encircling a part of said sleeve and operable to move the rod and sleeve together a predetermined distance and thereby bring the shear blades together, and a spring within the sleeve and encircling a portion of said rod to effect relative axial movement between the rod and sleeve to thereby separate the shear blades.

8. Charge severing mechanism including a horizontal ram, means slidingly supporting the ram, a pair of shear blades at one end of the ram, means for reciprocating the ram to thereby alternately place the shear blades in cutting and rest positions, means for moving the shear blades toward and away from each other, including links, a cross head to which the links are connected, an elongated sleeve mounted above and parallel with the ram for limited axial movement relative to the latter, a rod extending axially through said sleeve, a lever pivoted to the sleeve and connected at one end to the cross head, means pivotally connecting the other end of said lever and the adjacent end of said rod, means for moving the rod and sleeve together a predetermined distance to close the shear blades, means for effecting relative axial movement between said rod and sleeve to separate said blades, and means including a stationary cam for moving said lever and thereby effecting operation of the shear blades.

9. In combination, a rotary type bottle forming machine including an annular series of molds, a container for a supply body of glass from which mold charges are obtained at regular time intervals and delivered to the molds, charge severing mechanism arranged at one side of the machine and container and including a cutter, means including a plurality of fluid operated motors for moving the cutter back and forth between cutting and rest positions and actuating said cutter causing it to sever gathered mold charges from a supply body of glass, means for supplying air under pressure to the motors, solenoid operated valves for regulating and controlling the flow of air under pressure to the motors, and switches actuated by movement of the molds to energize the solenoids in a predetermined order.

10. Charge severing mechanism comprising a horizontal ram mounted for reciprocation along a horizontal path, a vertical hinge pin at one end of the ram, shear arms journaled on said pin, blades on said arms, a cross head, links connecting the cross head and shear arms, means for moving the cross head back and forth in the direction of the length of the ram to thereby move the shear blades toward and away from each other, said last named means including an elongated sleeve mounted for axial reciprocation lengthwise of said ram, a push rod within the sleeve, a plurality of levers connecting the rod, sleeve, and cross head together, means for moving the rod and sleeve together a predetermined distance to impart cutting movement to the shear blades, means for effecting relative axial movement between said rod and sleeve and causing separation of the shear blades, and means for reciprocating the ram to thereby alternately place the shear blades in working and rest positions.

11. Charge severing mechanism comprising a horizontal ram mounted for reciprocation along a horizontal path, a vertical hinge pin at one end of the ram, shear arms journaled on said pin, blades on said arms, a cross head, links connecting the cross head and shear arms, means for moving the cross head back and forth in the direction of the length of the ram to thereby move the shear blades toward and away from each other, said last named means including an elongated sleeve mounted for axial reciprocation lengthwise of said ram, a push rod within the sleeve, a plurality of levers connecting the rod, sleeve, and cross head together, means for moving the rod and sleeve together a predetermined distance to impart cutting movement to the shear blades, a cam adapted to effect relative movement between certain of the levers during axial movement of the rod and sleeve causing relative axial movement between said rod and sleeve and separation of the shear blades, and means for reciprocating said ram to thereby alternately place the shear blades in working and rest positions.

12. Charge severing mechanism comprising a horizontal ram mounted for reciprocation along a horizontal path, a vertical hinge pin at one end of the ram, shear arms journaled on said pin, blades on said arms, a cross head, links connecting the cross head and shear arms, means for moving the cross head back and forth in the direction of the length of the ram to thereby move the shear blades toward and away from each other, said last named means including an elongated sleeve mounted for axial reciprocation lengthwise of said ram, a push rod within the sleeve, a plurality of levers connecting the rod, sleeve, and cross head together, means for moving the rod and sleeve together a predetermined distance to impart cutting movement to the shear blades, a cam adapted to effect relative movement between certain of the levers during axial movement of the rod and sleeve causing relative axial movement between said rod and sleeve and separation of the shear blades, means for reciprocating said ram to thereby alternately place the shear blades in working and rest positions, said means for imparting axial movement to the rod and sleeve including expansible coil springs individual to the rod and sleeve, and means for placing the springs under tension substantially at the time the shear blades reach the rest position.

13. In combination, a pair of shears, a horizontal ram carrying said shears at one end and mounted for reciprocation to thereby alternately place the shears in cutting and rest positions, means for actuating the shears, a fluid operated motor for reciprocating the ram and shears, separate devices for controlling the operations of the motor and shear actuating means, and means for operating said devices in succession and in a fashion to allow the ram to rest a period of time in its projected position in advance of actuation of the shears.

14. In combination, a pair of shears, a horizontal ram carrying said shears at one end and mounted for reciprocation to thereby alternately place the shears in cutting and rest positions, spring means for imparting cutting movement to the shears, a fluid operated motor for reciprocating the ram and shears, an air operated trip device for controlling operation of the shear actuating means, solenoid operated valves individual to the ram reciprocating motor and trip device, and means whereby the solenoid valves are operated in succession and in such timed relation that the ram is allowed to rest a predetermined period of time in its projected position prior to actuation of the shears.

15. Charge severing mechanism comprising a horizontal ram, a pair of pivoted shear blades at one end of the ram, means for reciprocating the ram to thereby place the shears in cutting position periodically, means including a coil spring for moving the shear blades about their pivot while in cutting position, and means operable during movement of the ram away from said cutting position for compressing the spring preparatory to a succeeding operation of the shears.

16. Charge severing mechanism comprising a horizontal ram, a pair of pivoted shear blades at one end of the ram, means for reciprocating the ram to thereby place the shears in cutting position periodically, means for moving the shear blades about their pivot while in cutting position including a coil spring, means for compressing the coil spring, and means for releasing the spring and allowing it to expand while the shears are in said cutting position.

17. Charge severing mechanism comprising a horizontal ram, a pair of pivoted shear blades at one end of the ram, means for reciprocating the ram to thereby place the shears in cutting position periodically, means for moving the shear blades about their pivot while in cutting position including a coil spring, means operated by movement of the ram away from the cutting position for compressing the spring, and means operated by movement of the ram to said cutting position for releasing the spring and thereby actuating the shear blades.

18. Charge severing mechanism comprising a horizontal ram, a pair of pivoted shear blades at one end of the ram, means for reciprocating the ram to thereby place the shears in cutting position periodically, spring means for moving the blades toward and away from each other while in the cutting position and prior to movement of the ram away from said position, and means whereby movement of the ram controls operation of the spring means.

CARL W. SCHREIBER.
JOHN E. McLAUGHLIN.